(12) United States Patent
Law et al.

(10) Patent No.: US 10,772,439 B2
(45) Date of Patent: Sep. 15, 2020

(54) SAFETY HARNESS WITH ADJUSTABLE SEPARATION MECHANISM

(71) Applicant: MAGMATIC LIMITED, Bristol (GB)

(72) Inventors: Robert Law, Bristol (GB); Joe Allam, Bristol (GB); Alice Ives, Bristol (GB); Sarah Perks, Bristol (GB)

(73) Assignee: MAGMATIC LIMITED, Bristol (GB)

( * ) Notice: Subject to any disclaimer, the term of this patent is extended or adjusted under 35 U.S.C. 154(b) by 0 days.

(21) Appl. No.: 14/916,339

(22) PCT Filed: Aug. 18, 2014

(86) PCT No.: PCT/GB2014/052520
§ 371 (c)(1),
(2) Date: Mar. 3, 2016

(87) PCT Pub. No.: WO2015/033102
PCT Pub. Date: Mar. 12, 2015

(65) Prior Publication Data
US 2016/0213166 A1 Jul. 28, 2016

(30) Foreign Application Priority Data

Sep. 5, 2013 (GB) .................................. 1315812.6

(51) Int. Cl.
*A47D 13/08* (2006.01)
*A47D 13/04* (2006.01)
*A01K 27/00* (2006.01)

(52) U.S. Cl.
CPC .......... *A47D 13/086* (2013.01); *A01K 27/002* (2013.01); *A47D 13/046* (2013.01)

(58) Field of Classification Search
CPC ... A01K 27/002; A47D 13/046; A47D 13/086
(Continued)

(56) References Cited

U.S. PATENT DOCUMENTS 2,979,028 A * 4/1961 Zakely ............... A62B 35/0018
182/3
3,301,594 A * 1/1967 Pukish, Jr. ............ B60R 22/105
182/3

(Continued)

FOREIGN PATENT DOCUMENTS

FR 2823655 A1 10/2002
WO 2005025676 A1 3/2005

*Primary Examiner* — Tien Q Dinh
*Assistant Examiner* — Brady W Frazier
(74) *Attorney, Agent, or Firm* — Mossman Kumar & Tyler PC

(57) ABSTRACT

The present invention provides a safety harness for a user comprising a first panel arranged to be disposed against the user's chest. The harness further comprises two shoulder portions extending from the first panel and arranged to extend over the shoulders of the user. The harness further comprises a locating portion arranged to be disposed against the user's back. The harness further comprises an adjustment mechanism for adjusting the separation between the first panel and/or the shoulder portions and the locating portion in order to adjust the fit of the first panel and the two shoulder portions against the body of the user. The adjustment mechanism comprises at least one engagement feature. The harness further comprises a securement means located on said first panel. The securement means comprises at least one engagement feature for releasable engagement with the at least one engagement feature of the adjustment mechanism for maintaining the desired separation between the first panel and/or the shoulder portions and the locating portion.

11 Claims, 7 Drawing Sheets

(58) Field of Classification Search
USPC .................................................. 119/770, 907
See application file for complete search history.

(56) References Cited

U.S. PATENT DOCUMENTS

| | | | |
|---|---|---|---|
| 4,117,840 A | 10/1978 | Rasure | |
| 4,308,629 A | 1/1982 | Freemon | |
| 4,666,017 A | 5/1987 | Zimmerman | |
| 4,697,285 A | 10/1987 | Sylvester | |
| 5,119,767 A * | 6/1992 | Jimenez | B60R 22/105 119/770 |
| 5,163,450 A * | 11/1992 | Cadichon | A61F 5/3723 128/869 |
| 5,325,818 A * | 7/1994 | Leach | A01K 27/002 119/770 |
| 5,379,725 A * | 1/1995 | Roberson | A47D 13/086 119/770 |
| 5,397,171 A * | 3/1995 | Leach | A61F 5/3784 128/875 |
| 5,628,548 A * | 5/1997 | Lacoste | B60R 22/02 297/464 |
| 5,664,844 A * | 9/1997 | Greene | A47D 15/006 119/770 |
| 5,699,555 A | 12/1997 | Schunter | |
| 5,927,235 A * | 7/1999 | Olaiz | A47D 13/086 119/770 |
| 6,378,465 B1 * | 4/2002 | Austin | A62B 35/04 119/770 |
| 6,467,851 B1 * | 10/2002 | Mannell | A47D 13/086 119/770 |
| 6,968,809 B2 * | 11/2005 | Reardon | A47D 13/086 119/770 |
| 7,073,866 B1 * | 7/2006 | Berdahl | A47D 13/086 297/484 |
| 7,341,025 B1 * | 3/2008 | Streeter | A47D 13/046 119/770 |
| 8,702,177 B1 * | 4/2014 | Hogue | A61F 5/3769 297/484 |
| 8,959,664 B2 * | 2/2015 | Johnson | A62B 35/0025 182/3 |
| 2004/0045073 A1 * | 3/2004 | Marquez | A41B 13/00 2/69 |
| 2004/0058598 A1 * | 3/2004 | Miller | B63C 9/115 441/115 |
| 2004/0192517 A1 | 9/2004 | Shiu | |
| 2006/0278176 A1 | 12/2006 | Chigirnskaya et al. | |
| 2008/0072404 A1 | 3/2008 | Wetter | |
| 2011/0203531 A1 * | 8/2011 | Spinelli | A47D 13/086 119/770 |

* cited by examiner

SAFETY HARNESS WITH ADJUSTABLE SEPARATION MECHANISM

BACKGROUND TO THE INVENTION

The present invention relates to a harness, in particular to a harness for a child. The present invention also relates to reins comprising a harness for a child. The present invention also relates to a buckle for a harness.

Conventional harnesses, such as for example a child's harness, are worn across the shoulders of a user and are fastened at the back. It is important for the harness to be secured to the child so as to provide a tight fit. Known harnesses have shoulder straps and/or chest straps which can each be adjusted. It is however difficult and time consuming to adjust each of the straps of the harnesses to provide the necessary secure fit while also ensuring comfort for the user, such as for example the child. As a result, conventional harnesses do not usually provide a good fit for the user and can become loose during use. The conventional harnesses may also not be able to accommodate users, such as for example children, of differing sizes. There is therefore a need for a harness which is able to be adjusted quickly and easily to the size of the particular user and which will maintain a good secure fit for the user during use.

SUMMARY OF THE INVENTION

According to a first aspect, the present invention provides a safety harness for a user comprising:
- a first panel arranged to be disposed against the user's chest;
- two shoulder portions extending from the first panel and arranged to extend over the shoulders of the user;
- a locating portion arranged to be disposed against the user's back;
- an adjustment mechanism for adjusting the separation between the first panel and/or the shoulder portions and the locating portion in order to adjust the fit of the first panel and the two shoulder portions against the body of the user, in which the adjustment mechanism comprises at least one engagement feature; and
- a securement means located on said first panel, in which the securement means comprises at least one engagement feature for releasable engagement with the at least one engagement feature of the adjustment mechanism for maintaining the desired separation between the first panel and/or the shoulder portions and the locating portion.

The harness may be worn by placing over the head and shoulders of a user, such as for example a child. The harness preferably comprises a fastening arrangement comprising at least two fastening members for releasable engagement. The at least two fastening members may be arranged so that when the fastening members are disengaged the harness may be opened and placed over the arms of a user.

The fastening arrangement may be located in any suitable position on the harness. The fastening arrangement is preferably located in a region which is not easily accessible by the user. For example, the fastening arrangement is preferably arranged to be disposed against the user's back.

The locating portion may be a fastening arrangement. For example, the locating portion may comprise at least two separable body portions. Each body portion may comprise a fastening element for releasable mutual engagement with the fastening element of the other body portion. Each body portion may be in communication with a separate shoulder portion. The locating portion may for example be a buckle comprising at least two body portions for mutual engagement.

The locating portion may comprise at least one engagement feature for receiving and/or engaging a portion of the adjustment mechanism. The at least one engagement feature may be selected from channel(s) and/or opening(s). For example, at least one of the body portions of the locating portion may provide at least one engagement feature for receiving and/or engaging a portion of the adjustment mechanism.

The at least one engagement features provided by the first and second body portions may be any suitable feature for engaging or receiving a portion of a harness or strap. For example, the at least one engagement features may be selected from, but not limited to, channels or openings through which a portion of the harness or strap may extend or be secured to.

The opening(s) or channel(s) is preferably located at any suitable located on the body portion. For example, the opening(s) or channel(s) is preferably located at or adjacent the first end of the body portion of the first and/or second body portion(s). The body portion preferably comprises an inner surface arranged in use to be located adjacent a body of a user, an opposed outer surface and a side portion extending therebetween. A channel(s) may be provided by the side portion of the body portion(s) at a first end of the body portion and extends between the inner and outer surfaces of the body portion.

The adjustment mechanism preferably comprises at least one adjustment portion. The at least one adjustment portion may comprise the at least one engagement feature. The adjustment mechanism may comprise an engagement portion comprising the at least one engagement feature. The engagement portion may be connected to the at least one adjustment portion.

The at least one adjustment portion may be composed of any suitable material, such as for example webbing. Preferably the at least one adjustment portion is composed of non-elasticated material.

The adjustment mechanism preferably comprises at least one first adjustment portion extending between the two shoulder portions and the locating portion. For example, the adjustment mechanism may comprise two first adjustment portions.

Each first adjustment portion may extend from a separate shoulder portion of the harness. The first adjustment portion(s) may be arranged to adjust the separation between the shoulder portion(s) and the locating portion. The at least one first adjustment portion may comprise an engagement feature be connected to an engagement portion for releasable engagement with the securement means on the first panel.

The adjustment mechanism may further comprise at least one second adjustment portion extending between the locating portion and the first panel. For example, the first panel preferably comprises two opposed spaced apart side portions. The at least one second adjustment portion preferably extends from or adjacent at least one of the side portions of the first panel to the locating portion. The adjustable mechanism may comprise two second adjustment portions. Each second adjustment portion may extend between a separate side portion of the first panel and the locating portion. Each second adjustment portion may extend from an opposing end of the locating portion to pass round a side of a user so as to engage the securement means. The second adjustment portion(s) may be arranged to adjust the separation between the first panel and the locating portion. The at least one second adjustment portion may comprise at least one engagement feature, or be connected to an engagement portion, for releaseable engagement with the securement means on the first panel.

At least one first adjustment portion may be in communication with at least one second adjustment portion. For example, the first adjustment portion(s) may be attached to the second adjustment portion(s) by any suitable mechanism such as for example, stitching or by additional fastening elements, such as for example buckles or clips.

Preferably, the adjustment mechanism comprises at least one adjustable member, for example a pair of adjustable members. Each adjustment member comprises a first adjustment portion and a second adjustment portion. The first and second adjustment portions of each adjustment member may be in communication with each other, such as for example connected together. The first and second adjustment portions may be provided by separate regions of a single adjustment member. Each adjustment member preferably comprises at least one engagement feature for engaging the at least one engagement feature of the securement means. For example, each adjustment member may comprise an engagement portion.

For example, the harness may comprise a first adjustment member comprising a first adjustment portion extending between a first shoulder portion and the locating portion, and a second adjustment portion extending between a first side portion of the first panel and the locating portion. Preferably, the second adjustment portion extends between a first side portion and a first end of the locating portion. The harness may comprise a second adjustment member comprising a second first adjustment portion extending between a second shoulder portion and a locating portion, and a second second adjustment portion extending between a second side portion of the first panel and the locating portion. Preferably, the second adjustment portion of the second adjustment member extends between a second side portion and a second end of the locating portion. The first and second ends of the locating portion are preferably opposed to each other.

At least one of the first and/or second adjustment portions may comprise at least one engagement feature for engaging the at least one engagement feature of the securement means. At least one of the first and/or second adjustment portions may be connected to an engagement portion of the adjustment mechanism. The adjustment portion(s) may be connected to an engagement portion by any suitable mechanism, such as for example by means of stitching or by additional fastening elements, such as for example a buckle or clip. The engagement portion preferably comprises at least one engagement feature for engaging the securement means. At least one engagement feature, or engagement portion, may be provided between the first adjustment portion and the second adjustment portion of an adjustment member.

The locating portion may be a fastening arrangement comprising a plurality of, for example two, body portions. Each body portion may comprise a fastening element for releaseable mutual engagement with the fastening element of an adjacent body portion. The locating portion may be in the form of for example a buckle.

The locating portion preferably further comprises a locking mechanism. The locking mechanism is preferably operable between a first position in which the fastening elements of adjacent body portions are retained in an engaged position, and a second position in which the fastening elements of adjacent body portions are disengaged from each other.

For example, the locating portion preferably comprises a first body portion and a second body portion. The first body portion preferably comprises at least one projection extending outwardly from the body portion. The at least one projection preferably extends from the first body portion in a direction extending parallel to the plane of the body portion.

The first body portion preferably comprises a first end providing at least one engagement feature for receiving and/or engaging a portion of the adjustment mechanism, and a second opposed end providing the at least one projection. Preferably the first end provides at least one channel or opening for receiving and/or engaging a portion of the adjustment mechanism. The projection(s) may for example be in the form of a tab.

The second body portion preferably comprises at least one channel shaped and dimensioned to receive the projection(s), such as for example the tab(s), of the first body portion. The second body portion preferably comprises an inner surface arranged in use to be located against the user, and an outer surface. The at least one channel preferably extends between the inner and outer surface of the second body portion. For example, the channel(s) preferably comprises a first surface located adjacent the inner surface of the second body portion; and a second surface located adjacent the outer surface of the second body portion. The first and second surfaces are preferably opposed to each other. The second body portion preferably comprises a first end comprising at least one engagement feature for receiving and/or engaging at least a portion of the adjustment mechanism, and a second opposed end providing the at least one channel. Preferably the first end provides at least one channel or opening for receiving and/or engaging at least a portion of the adjustment mechanism.

The second body portion preferably provides at least one opening in communication with the at least one channel. Preferably, the outer surface of the second body portion provides the at least one opening. The opening(s) may be provided in any suitable location on the second body portion. The opening may for example be located such that when the first and second body portions are in the engaged position the opening(s) is provided in a substantially central location of the locating member.

The first and/or second body portions may comprise an inner surface arranged in use to be located adjacent the body of a user, an opposed outer surface, and a side portion extending therebetween. At least one of the first and/or second body portions preferably comprises at least one channel for engaging or receiving a portion of a harness. The channel preferably extends from the inner surface of the body portion to the side portion at the first end of the body portion. Preferably, the channel(s) extends from the inner surface at or adjacent the first end of the body portion, to the side portion at the first end of the body portion.

The at least one engagement feature of the first and/or second body portions may be provided by at least one engagement member which is attached to the respective one of said first and/or second body portions. Preferably the, or each, engagement member releasably engages the body portion. For example, the engagement member may resiliently engage the body portion (for example being snap fitted to the body member). Preferably, a first engagement member is arranged in use to releasably engage the first body portion. Preferably, a second engagement member arranged in use to releasably engage the second body portion. For example, the body portion of the first or second body portion preferably comprises at least one opening or channel arranged to releasably engage at least one engagement member comprising the at least one engagement feature.

The, or each, engagement member may be resiliently moveable relative to the body portion. For example the, or each, engagement member may be connected to the body portion by at least one resilient arm. Resilient movement of the engagement member may selectively align the engagement member with a cooperating feature (for example a ridge or recess) in the body portion. Resilient movement of the engagement member relative to the body portion may enable the at least one opening or channel of the engagement feature to be varied in use (for example by selectively widening the channel). The resilient movement of the engagement member may enable the engagement feature to selectively grip the harness or strap. The engagement member is typically biased towards the position in which the harness or strap is gripped such that the user must resiliently displace the member against said bias to release the harness or strap (for example to adjust the harness or strap position). An external surface of the engagement member may extend beyond the body portion and may form a button.

The first body portion preferably further comprises at least one retaining feature. The retaining feature(s) is preferably provided by or adjacent to the projection(s). The retaining feature(s) is preferably shaped and dimensioned to be received within the channel and to extend into the opening provided by the second body portion. Each retaining feature(s) is preferably arranged to prevent separation of the first and second body portions. Preferably each retaining feature comprises an abutment surface for engaging a portion of the second body portion in order to prevent separation of the first and second body portions, for example, removal of the projection(s) of the first body portion from the second body portion. Preferably, the abutment surface of each retaining feature is arranged to engage a portion of the second body portion which is located adjacent the opening(s) in the outer surface.

The first body portion preferably comprises an inner surface arranged in use to be located adjacent the user. The retaining feature(s) is preferably resiliently biased to extend outwardly from the first body portion, for example away from the inner surface, of the first body portion. The retaining feature(s) may extend away from the body portion, for example from the inner surface, at any suitable angle. The retaining feature(s) preferably comprises a first end located at or adjacent the free end of the projection(s) and a second end located at or adjacent the body portion of the first body portion. The retaining feature(s) is preferably resiliently biased such that the second end of the retaining feature extends outwardly from the body portion, for example from the inner surface, of the first body portion. The second end of the retaining feature preferably extends at an angle to the plane of the first body portion. The plane of the body portion being the plane in which the majority of the body portion and projection(s) lies. The second end of the retaining feature(s) preferably provides an abutment surface for engaging a portion of the second body portion located adjacent the opening(s). The retaining feature(s) may be in the form of a tab.

In use, the second end of the first body portion is aligned with and moved towards the second end of the second body portion. The projection(s) of the first body portion is received within the channel(s) of the second body portion. The channel(s) is shaped and dimensioned such that subsequent movement of the projection(s) of the first body portion into the channel(s) of the second body portion causes the retaining feature(s), for example the second end of the retaining feature, to abut the second surface of the channel(s) of the second body portion.

During insertion, the force exerted on the resilient retaining feature(s) is preferably sufficient to cause the retaining feature, for example the second end of the retaining feature, to be sufficiently displaced inwardly towards the inner surface of the first body portion in order to enable the projection(s) to be inserted into the channel(s) of the second body portion. Subsequent movement of the first body portion into the channel causes the resilient retaining feature(s) to be aligned with the opening(s) provided in the outer surface of the second body portion. Removal of the external force on the resilient retaining feature(s) causes the retaining feature(s), for example the second end of the retaining feature(s) to extend outwardly from the inner surface of the first body portion. At least a portion of the retaining feature(s) is received within the opening of the second body portion. The retaining feature(s), for example the second end of the retaining feature(s), provides an abutment surface which engages a portion of the second body portion adjacent the opening(s) to prevent removal of the projection(s) of the first body portion from the channel(s) of the second body portion. The retaining feature(s) therefore provides secure fastening of the body portions of the locating portion.

The opening(s) provided by the second body portion is preferably shaped and dimensioned to be easily accessible by the fingers of a user. In order to remove the harness, sufficient force is applied by the user to the retaining feature(s), for example to the second end of the retaining feature(s), in order to displace at least a portion of the retaining feature(s) towards the first body portion. Once displaced sufficiently, the protrusion(s) of the first body portion may be removed from the channel(s) of the second body portion by moving the first and second body portions in a direction away from each other. Preferably, the force required to depress the retaining feature(s) of the first body portion is sufficient such that the locating portion cannot be undone by a child.

It is to be understood that the locating portion may comprise more than two body portions. Each pair of adjacent body portions preferably comprises a locking mechanism, such as for example at least one retaining feature and at least one opening as described above.

Each body portion of the locating portion further provides at least one channel to receive the adjustment mechanism. Preferably, each body portion of the locating portion provides at least one channel to receive a first and/or second adjustment portion. The body portion(s) preferably comprises an inner surface arranged in use to be located against the user, an outer surface, and a side portion extending therebetween. Preferably each channel comprises a first opening provided by the inner surface of the body portion of the separable member and a second opening provided by a side portion of the body portion.

Preferably, each body portion comprises a first opening or channel for receiving a first adjustment portion extending from a shoulder portion, and a second opening or channel for receiving a second adjustment portion extending from an end or from a region adjacent an end of the locating portion.

The locating portion may comprise an attachment means for engaging a loop or strap which is to be held by an adult. The attachment means may be any suitable means for connecting the locating portion to the loop or strap. The attachment means may comprise a plurality of openings, such as for example two openings, shaped and dimensioned to receive a loop or strap. The attachment means may comprise hooks or loops. The attachment means may be provided in any suitable location. Preferably, the attachment means is located centrally with respect to the locating portion. The attachment means may be provided by a single separable member of the locating portion.

The engagement feature(s) provided by the securement means and/or the adjustment mechanism may be selected from Velcro, hooks and eyes.

The harness may further comprise a cover flap located and arranged to extend over and substantially cover the securement means. The cover flap is preferably arranged to also extend over and substantially cover secured portions of the adjustment means on the first panel. The cover flap may be secured in position by any suitable means, such as for example Velcro, hooks and eyes, zips, buttons, or any combination thereof. The cover flap preferably extends from a first side of the first panel to the opposing second side of the first panel. The cover flap prevents the user, such as for a child, releasing the adjustment means from the securement means.

The harness can be removed by disengaging the fastening elements and removing the harness from the arms of the user. The harness is maintained in the desired arrangement to provide a snug fit for the user. The harness may then be re-secured to the user by engaging the fastening elements and does not require any additional adjustments in order to secure the shoulder portions in the correct position relative to the locating portion.

According to a further aspect of the invention, there is provided reins for a user, comprising a harness as herein described, and a strap arranged to releasably engage the harness, in which the strap comprises an elasticated region.

Preferably, the strap comprises an attachment means for attachment to the harness, preferably to the locating portion of the harness. Preferably, the attachment means is located at a first end of the strap. The attachment means may for example be a hook or a clip. The strap may further comprise a loop for receiving the hand of a user. The loop is preferably located at or adjacent a second end of the strap.

The elasticated region is preferably arranged to provide a shock absorbing effect between the forces exerted at the second end of the strap, in use, and the harness. As a result, the reins can be worn with minimal discomfort to the user, such as for example a child.

Preferably, the elasticated region is located at or adjacent the first end of the strap. The elasticated region preferably comprises an elasticated member comprising a first end attached at a first location to the strap, and a second end attached at a second location to the strap. In the unstretched state, the length of the elasticated member is less than the length between the first and second locations on the strap. The difference in length between the length of the elasticated member and the spacing between the first and second locations of the strap determines the amount of shock absorbancy which can be provided by the strap.

The first and second ends of the strap may be attached to the locating portion in the form of a loop.

The harness may further comprise a pouch shaped and dimensioned to substantially encompass the harness. The harness may therefore be placed within the pouch when not in use. The pouch preferably provides an opening through which the harness may be inserted into the cavity provided by the pouch. The pouch may comprise at least one closure means for closing the opening of the pouch. The closure means may be any suitable means for closing the opening, such as for example, hooks, buttons, toggles, zips or Velcro.

The pouch may further comprise a hook or clip arranged to be used to hang the pouch up when not in use.

The pouch may have any suitable shape for receiving the harness. The pouch is preferably attached to the harness. The pouch may be attached to any suitable portion of the harness. For example, the pouch may be attached to the first panel of the harness. The pouch may be located on the first panel between the first and second shoulder portions. The pouch is preferably arranged such that when the harness is being worn the pouch is located on or adjacent the inner surface of the first panel. The inner surface of the first panel is the surface arranged in use to contact the body of the user.

The pouch may be received within a pocket. The harness may provide a pocket shaped and dimensioned to retain the pouch when the harness is being worn. For example, the inner surface of the first panel may provide a pocket arranged to receive the pouch when the harness is in use. The pocket may be provided by the pouch. For example, the pouch may be able to be inserted through the opening provided by the pocket into the cavity provided by the pocket.

The pouch may be composed of suitable material, such as for example thin lightweight material, such that the pouch may be folded so as to be received within the pocket when not required.

According to a further aspect of the invention, there is provided a fastening arrangement for use with a harness as herein described, in which the fastening arrangement comprises:
- a first body portion including at least one projection extending from the body portion, in which the projection(s) comprises at least one outwardly projecting retaining feature; and
- a second body portion including at least one channel arranged to receive the projection(s) of the first body portion; and in which an outer surface of the second body portion further provides at least one opening in communication with the at least one channel;
- in which each of the first and second body portions comprise at least one engagement feature for engaging at least a portion of a strap or harness, and
- in which the first and second body portions are releasably engageable such that in the engaged position the projection(s) of the first body portion is received within the channel(s) of the second body portion such that the retaining feature(s) is received within the at least one opening of the second member and is arranged to prevent disengagement of the first and second body portions.

The at least one engagement features of the first and second body portions may for example be openings or channels.

BRIEF DESCRIPTION OF THE DRAWINGS

An embodiment of the invention will now be described, by way of example only, and with reference to the accompanying drawings, in which.

DETAILED DESCRIPTION OF THE INVENTION

Figures 5A, 5B:
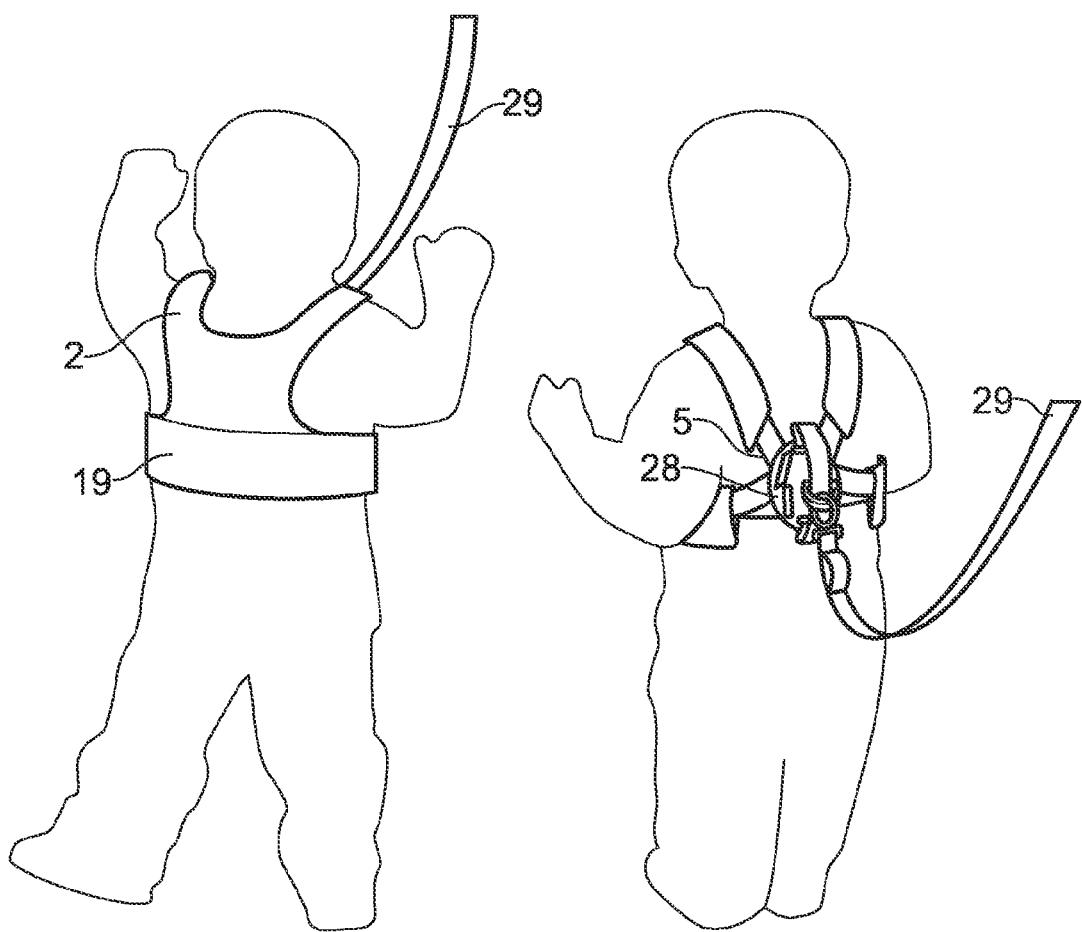
FIGS. 5A and 5B illustrate front and rear views of the harness of FIG. 1 as worn by a child.

With reference to the figures, the harness 1 comprises a first panel 2 and two shoulder portions 3,4. The first panel 2 is arranged to be disposed against the user's chest as shown in FIG. 5A. The two shoulder portions 3,4 extend from the first panel 2 and are arranged to extend over the shoulders of the child (as shown in FIGS. 5A and 5B).

The harness 1 further comprises a locating portion 5 arranged to be disposed against the user's back (as shown in FIGS. 5A and 5B). The locating portion 5 comprises a first body portion 6 and a second body portion 6' which are adapted to be secured together by two fastening elements (not shown) arranged for mutual engagement. The first and second body portions 6,6' are arranged to be brought together and for the fastening elements to engage each other by movement towards each other along an axis extending from one side to the other side of the body of the user. Each body portion 6,6' provides two spaced apart channels 7,7', 8,8'.

The harness 1 further comprises an adjustment mechanism 11 disposed against the user's back (as shown in FIGS. 5A and 5B). The adjustment mechanism 11 is capable of adjusting the separation between the first panel 2 and the shoulder portions 3,4 and the locating portion 5 in order to adjust the fit of the harness 1 to accommodate and provide a snug fit against the body of the user.

The adjustment mechanism 11 comprises a pair of adjustment members 9, 10. Each adjustment member 9,10 comprises a first adjustment portion 12,12' extending between a shoulder portion 3,4 and the locating portion 5. A first end 13,13' of each first adjustment portion 12,12' is attached to a shoulder portion 3,4.

The first and second body portions 6,6' each have an inner surface (not shown) arranged in use to be located against the user, an outer surface 21,21', and a side portion (not shown) extending therebetween. Each channel 7,7',8,8' comprises a first opening provided by the inner surface of the body portion 6,6' and a second opening provided by a side portion of the body portion 6,6' of the locating portion 5.

Each first adjustment portion 12,12' is received within and extends through a first channel 7,7' provided by a first or second body portion 6,6' of the locating portion 5.

Each adjustment member 9,10 each further comprises a second adjustment portion 14,14' extending between a side portion 15,15' of the first panel 2 and the locating portion 5. A first end (not shown) of the second adjustment portion 14,14' is attached to the side portion 15,15' of the first panel 2. Each second adjustment portion 14,14;' is received within and extends through a second channel 8,8' provided by the body portions 6,6' of the locating member 5.

The adjustment mechanism 11 further comprises two engagement portions 17,17'. Each engagement portion 17,17' is located adjacent a second end 22,22',23,23' of each of the first 12,12' and second 14,14' adjustment portions.

Each engagement portion 17,17' is attached to the first and second adjustment members by a buckle 24,24'. Each buckle provides an opening 25,25' through which the adjustment members 9,10 can extend.

The first and second body portions 6,6' of the locating portion 5 are located between the respective engagement portion 17,17' and the first ends of the first and second adjustment portion of the adjustment members 9,10.

The harness 1 further comprises a securement means 18 located on the first panel 2. The securement means 18 extends across the width of the first panel 2. The term "width" herein is used to refer to the dimension which extends across the chest of the user in use, from one arm of the user to the other arm of the user. It is however to be understood that the securement means may be located at any suitable position on the harness. For example, the securement means 18 could be located centrally on the first panel 2 with respect to the body of the user. Furthermore, the harness may comprise a plurality of securement means, such as for example two spaced apart securement means. The securement means 18 extends from one side portion of the first panel to the other side portion of the first panel.

The or each securement means 18 is located to engage one of the engagement portions 17,17' of the adjustment mechanism 11. The securement means 18 comprises Velcro® for releasable engagement to the engagement portions 17,17' of the adjustment mechanism 11.

Figure 3:
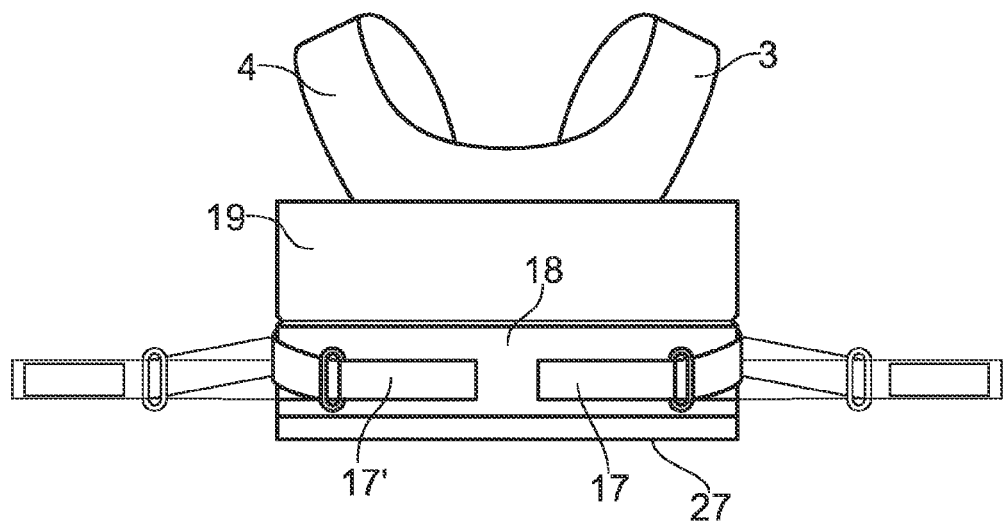
FIG. 3 illustrates a front view of the harness of FIG. 1 during securement of the adjustment mechanism.
Figure 4:
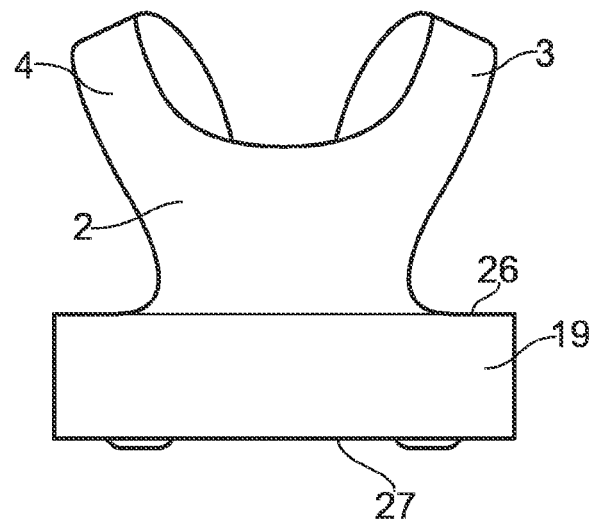
FIG. 4 illustrates a front view of the harness of FIG. 1 with the cover flap in a closed position.

The harness 1 further comprises a cover flap 19 located adjacent the securement means 16. The cover flap 19 is shaped and dimensioned to extend across, in use, and substantially cover the securement means 18 together with the engaged adjustment mechanism 11 such that the securement means 18 and the engagement portions 17,17' of the adjustment mechanism 11 are concealed as shown in FIG. 4. As shown in FIG. 3, the cover flap 19 extends from an upper edge 26 of the first panel 2 and is dimensioned to extend across to be secured at the lower edge 27 of the first panel 2. The cover flap 19 may be secured in place by any suitable means, such as for example zips, hooks and eyes, buttons, toggles or Velcro®, or any combination thereof. It is to be understood that the cover flap 19 may have any suitable dimensions, for example the cover flap 19 may be dimensioned to only extend across the securement means and the adjustment means 11 and may not extend from the upper edge 26 to the lower edge 27 of the first panel 2. By securing the cover flap 19 in position, the user is prevented from disengaging the securement means 18 and the engagement portions 17,17'.

In use, the first and second body portions 6,6' of the locating portion 5 are disengaged and the harness 1 can be placed over the arms of a user. The first panel 2 is placed across the chest of the user, in this case a child. The shoulder portions 3,4 are placed over the shoulders of the user. The fastening elements (not shown) of the body portions 6,6' of the locating portion 5 are brought into engagement such that the locating portion 5 is positioned across the back of the user. The first body portion 6 provides a projection which is shaped and dimensioned to be received within a channel provided by the second body portion 6'. The first body portion 6 comprises an inner surface arranged in use to be located against the user and an opposed outer surface. The first body portion 6 also comprises a resiliently biased retaining tab located on the projection. The tab is resiliently biased to extend outwardly in a direction away from the inner surface of the first body portion 6.

The second body portion 6' provides an opening in the upper surface 21' which is in communication with the channel. In the engaged position, the projection is received within the channel and the resiliently biased retaining tab extends into and is retained within the opening of the second body portion 6'. The resiliently biased retaining tab provides an abutment surface which abuts the portion of the second body portion 6' adjacent the opening so as to prevent separation of the first and second body portions 6,6'.

Figure 1:
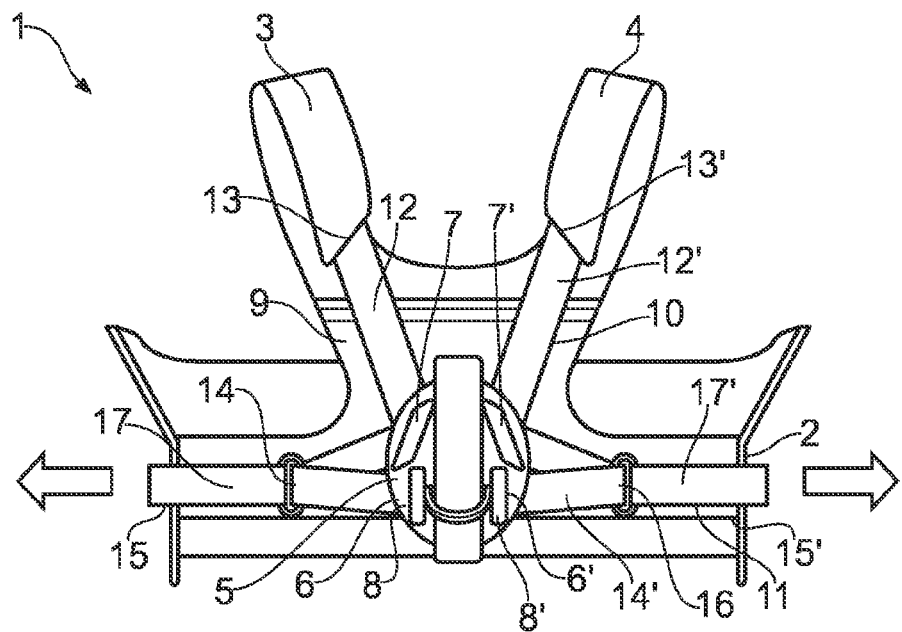
FIG. 1 illustrates a rear view of the harness according to one embodiment of the present invention prior to tightening the harness about a user's body.
Figure 2:
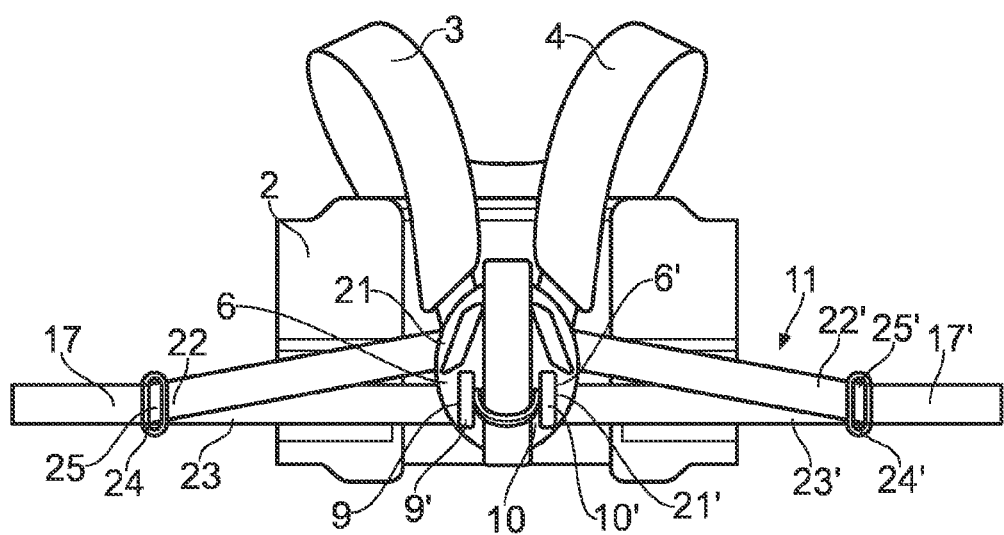
FIG. 2 illustrates a rear view of the harness of FIG. 1 in a tightened position.

The adjustment members 9,10 of the adjustment mechanism 11 are then pulled and tightened about the body of the user so as to adjust the separation of the shoulder portions 3,4 from the locating portion 5. The adjustment members 9,10 are pulled in opposite directions across the back of the user. As shown in FIG. 1, the adjustment members 9,10 are preferably tightened by pulling the members 9,10 away from opposing sides of the user. Once the harness has been adjusted by the adjustment mechanism 11 to provide the desired fit about the body of the user, the engagement portions 17,17' of the adjustment mechanism 11 are pulled around the sides of the user and across the first panel 2. The engagement portions 17,17' are brought into contact and engaged with the securement means 18. The cover flap 19 is then folded over the engagement portions 17,17' and the securement means 18 and secured in place.

In order to remove the harness from the user, the user depresses the resiliently biased retaining member of the first body portion 6. Once sufficient force has been applied, the body portions 6,6' of the locating portion 5 can be disengaged and the harness 1 can be removed from the arms of the user. The next time the harness 1 is used for the child, the harness 1 will provide the required snug fit for that particular user without any requirement to adjust the adjustment mechanism 11 or the securement means 18.

Figure 6A:
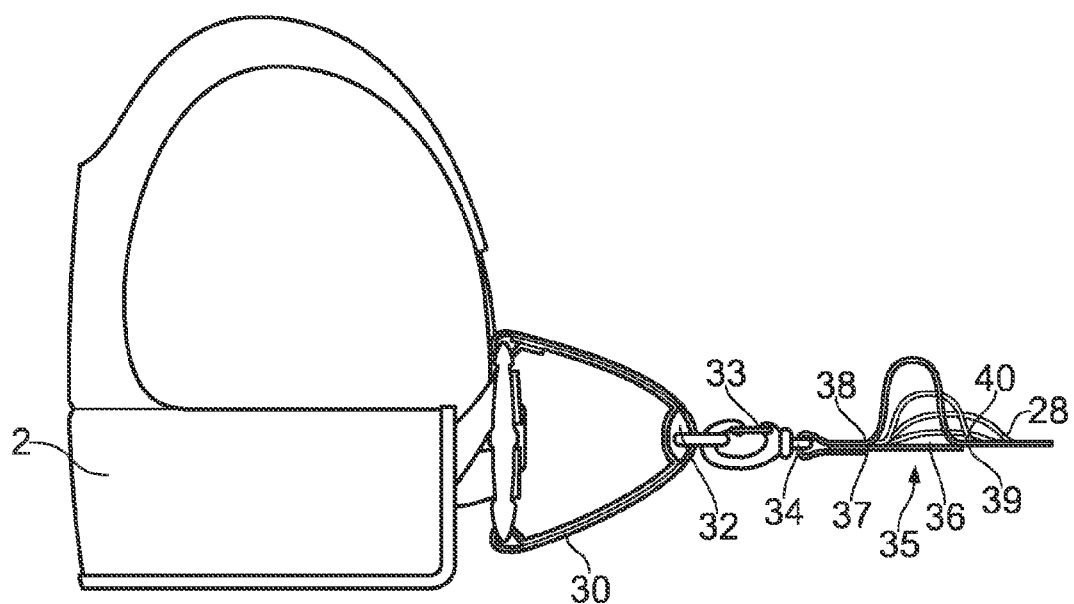
FIGS. 6A and 6B illustrate side views of the reins according to one embodiment of the present invention with the harness of FIG. 1.
Figure 6B:
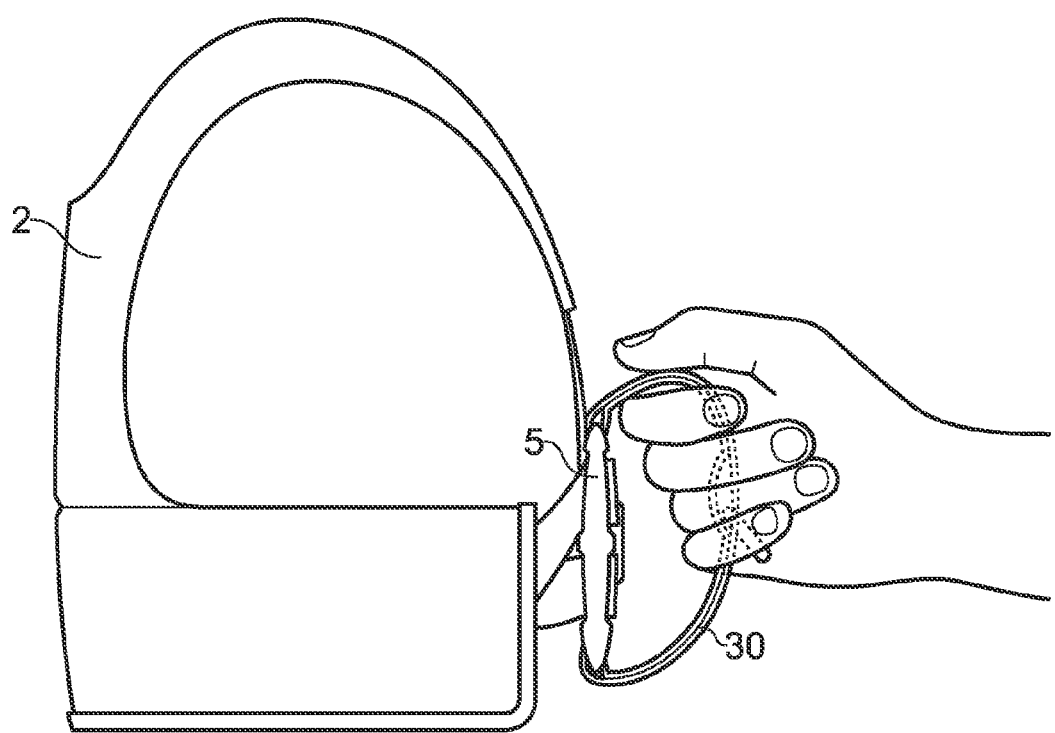

As shown in FIGS. 5 and 6, the locating portion 5 provides an attachment means 28, in this case a loop for attachment to a strap 29 which is to be held by an adult.

The locating portion 5 provides two spaced apart openings for receiving an end of a strap 30 to form a loop. The loop is shaped and dimensioned so as to be able to be used as a handle when required. The loop further provides an attachment ring 32 for releasable engagement to a strap 29. The strap 29 comprises a hook 33 at a first end 34 of the strap 29. The strap 29 also comprises an elasticated region 35 located adjacent the first end 34 of the strap 29. The elasticated region 35 comprises an elasticated member 36 attached at a first end 37 to a first location 38 on the strap 29. The elasticated member 36 is attached at a second end 39 to a second location 40 on the strap 29. The elastic region 35 is arranged to provide a shock absorbing region adjacent the end 34 of the strap 29 adjacent the child so that any force exerted on the strap 29 by a child is transmitted smoothly to the user so as to improve the comfort of the harness and reins.

Figure 7:
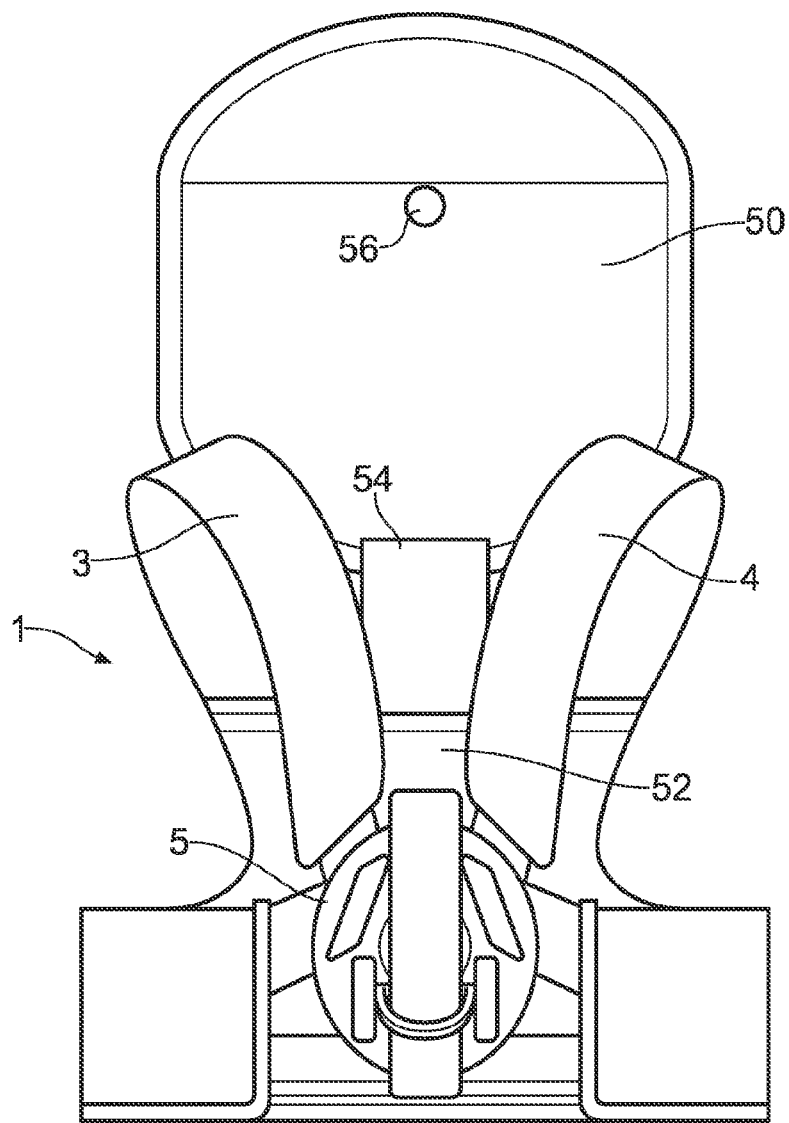
FIG. 7 illustrates a view from behind of one embodiment of the reins, in which the reins comprises a pouch.
Figure 8:
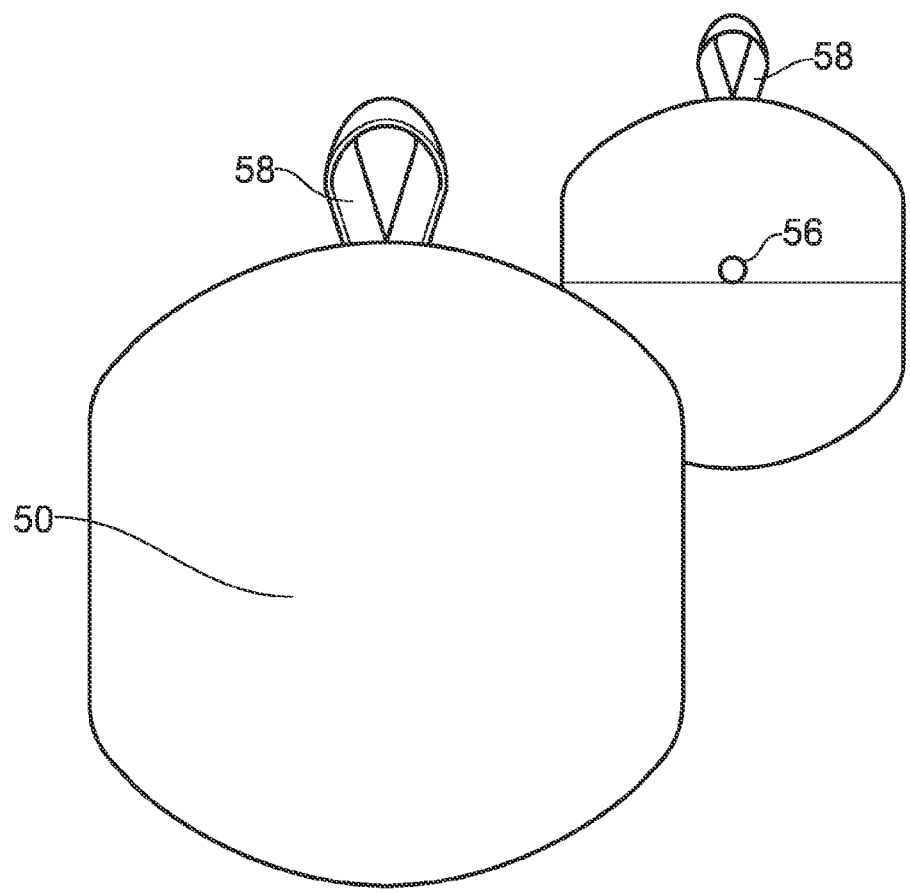
FIG. 8 illustrates views from the front and from behind of the embodiment of FIG. 7 in which the reins are enclosed within a pouch.

As shown in FIGS. 7 and 8, the harness 1 may further comprise a pouch 50 for receiving the harness 1 when not in use. The pouch 50 is shaped and dimensioned to substantially encompass the harness 1 when not in use. When the pouch 50 is not required, when for example the harness 1 is being worn by a user, the pouch 50 is arranged to be located adjacent the inner surface 52 of the first panel 2. The inner surface 52 is the surface of the first panel 2 which in use is placed adjacent the body of the user. The pouch 50 is composed of lightweight material. The pouch 50 may be folded and retained within the pocket provided by the pouch 50 when not required. The pouch 50 is attached to the first panel 2 by a buckle 54. The pouch 50 provides an opening (not shown) through which the harness 1 may be inserted into the pouch 50. The opening (not shown) is closed by a button 56 and a loop. The pouch 50 also comprises a hanging loop 58 which can be used to hang the pouch 50 when the harness is not in use.

Although aspects of the invention have been described with reference to the embodiment shown in the accompanying drawings, it is to be understood that the invention is not limited to the precise embodiment shown and that various changes and modifications may be effected without further inventive skill and effort. For example, one or more of the body portions of the locating portion may be composed of a plurality of separate connectable parts. For example, the number of parts may depend upon the method of manufacture and enable ease of manufacture.

The invention claimed is:

1. A safety harness for a user comprising:
a front panel arranged to be disposed against the user's chest when the harness is in use, the front panel comprising an elongate portion having a first end region, and a second end region separated from the first end region in a selected direction by an intervening region of the front panel;
securement means located on said front panel and extending the front panel in the selected direction from the first end region to the second end region, a first portion of the securement means overlying the first end region and a second portion of the securement means overlying the second end region;
a first shoulder portion attached at a proximal end thereof to an upper portion of the first end region of the front panel, and extending therefrom such that the first shoulder portion is arranged to extend over a first shoulder of the user when the harness is in use;
a second shoulder portion attached at a proximal end thereof to an upper portion of the second end region of the front panel, and extending therefrom such that the second shoulder portion is arranged to extend over a second shoulder of the user when the harness is in use, wherein the first shoulder portion is spaced from the second shoulder portion along the selected direction;
a locating portion arranged to be disposed against the user's back when the harness is in use, the locating portion further comprising first and second parts; and
adjustment means for adjusting separation between the front panel, the first and second shoulder portions and the locating portion in order to adjust the fit of the front panel and the first and second shoulder portions against the body of the user when the harness is in use, the adjustment means comprising first and second adjustment members, the first adjustment member comprising:
a first adjustment portion which extends from a distal end of the first shoulder portion, through an upper section of the first part of the locating portion to a first buckle;
a second adjustment portion which extends from a lower section of the first part of the locating portion to the first buckle; and
a first engagement portion extending from the first buckle, an end portion of the first engagement portion being releasably engageable with the first portion of the securement means via respective engagement features.

2. A harness as claimed in claim 1, wherein the first and second parts of the locating portion are releasably engageable with one another.

3. A harness as claimed in claim 1, in which each part of the locating portion provides at least one channel for receiving an adjustment portion.

4. A harness as claimed in claim 1, in which the engagement features of the securement means and the adjustment means are provided by a hook and loop fastener.

5. A harness as claimed in claim 1, in which the front panel further comprises a cover flap arranged to extend over and substantially cover the securement means.

6. A harness as claimed in claim 1, further comprising a pouch arranged to substantially encompass the harness when not in use.

7. A harness as claimed in claim 1, further comprising a pouch arranged to substantially encompass the harness when not in use, in which the pouch is located adjacent or on the front panel when the harness is not in use.

8. A harness as claimed in claim 1, further comprising a strap arranged to engage releasably with the harness, in which the strap comprises an elasticated region.

9. A harness as claimed in claim 8, in which a first end of the strap comprises an attachment means for engaging the harness, and in which the elasticated region is located at or adjacent the first end of the strap.

10. A harness as claimed in claim 8, in which the elasticated region comprises an elasticated member, in which a first end of the elasticated member is attached at a first location on the strap, and the second opposed end of the elasticated member is attached at a second location on the strap, in which the length of the elasticated member as measured between said first and second ends is less than the distance between the first and second locations on the strap.

11. A harness as claimed in claim 1, wherein the user is a child having arms, and wherein securement means extends across the chest of the child, in use, from one arm of the child to the other arm of the child.

* * * * *